Nov. 27, 1934.  H. J. BURNISH  1,982,496
ELECTRIC WELDING MACHINE
Filed Oct. 2, 1931   3 Sheets-Sheet 1
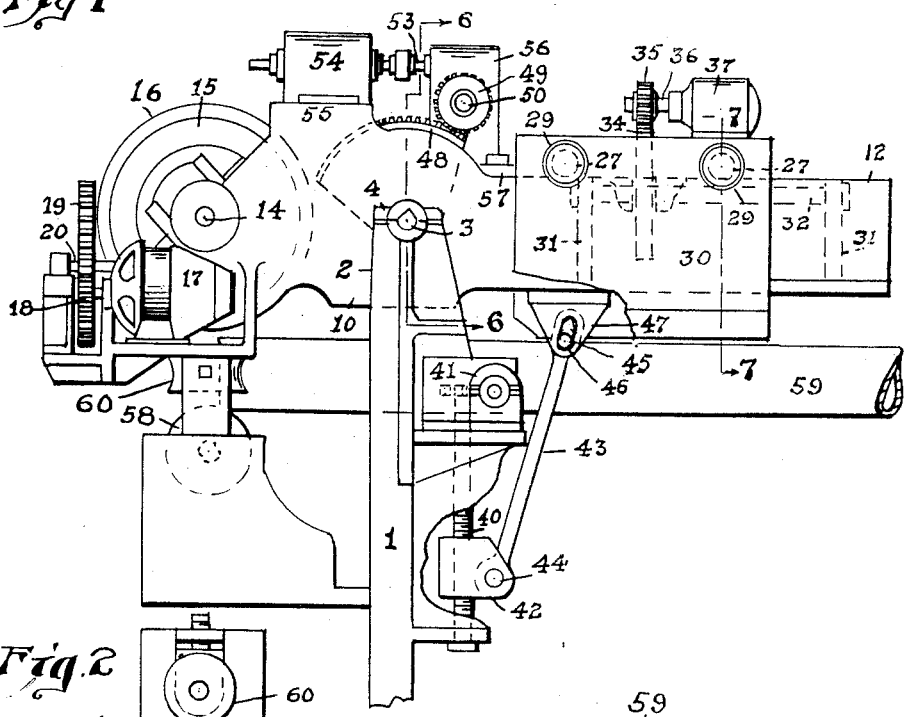
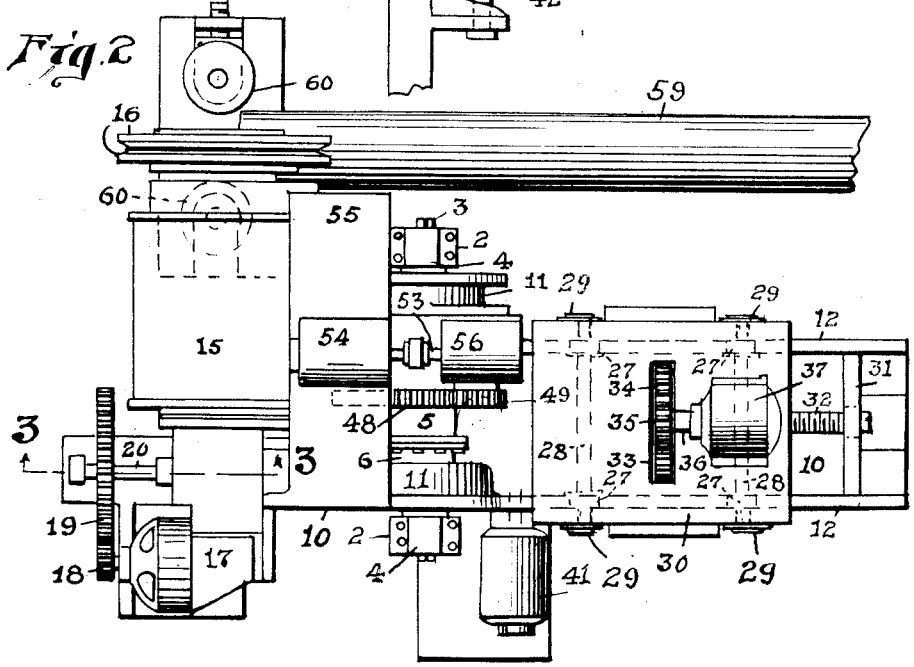

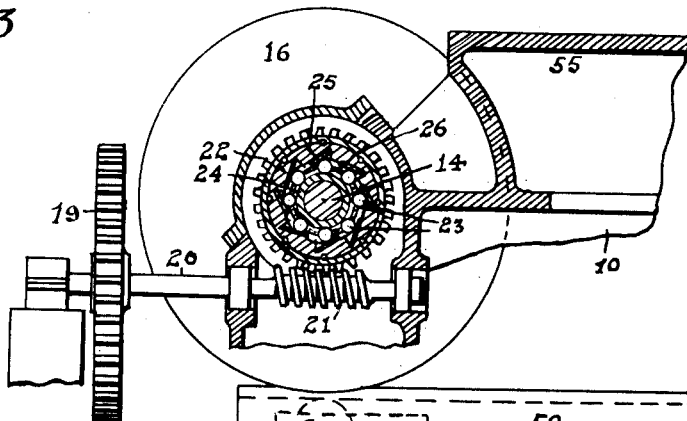
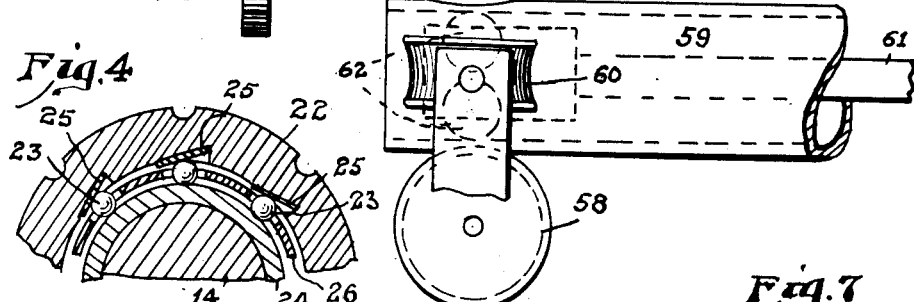
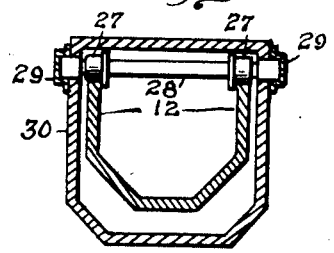
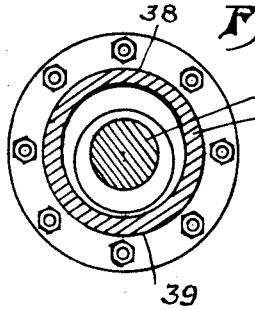
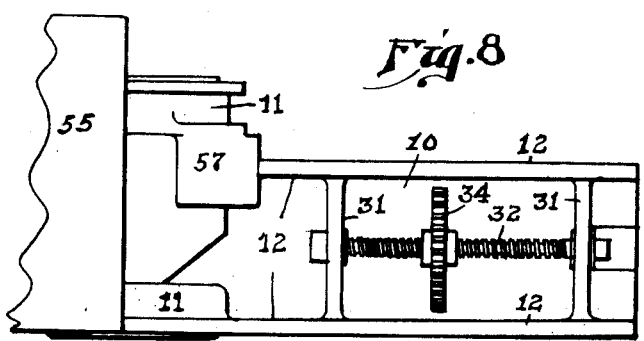

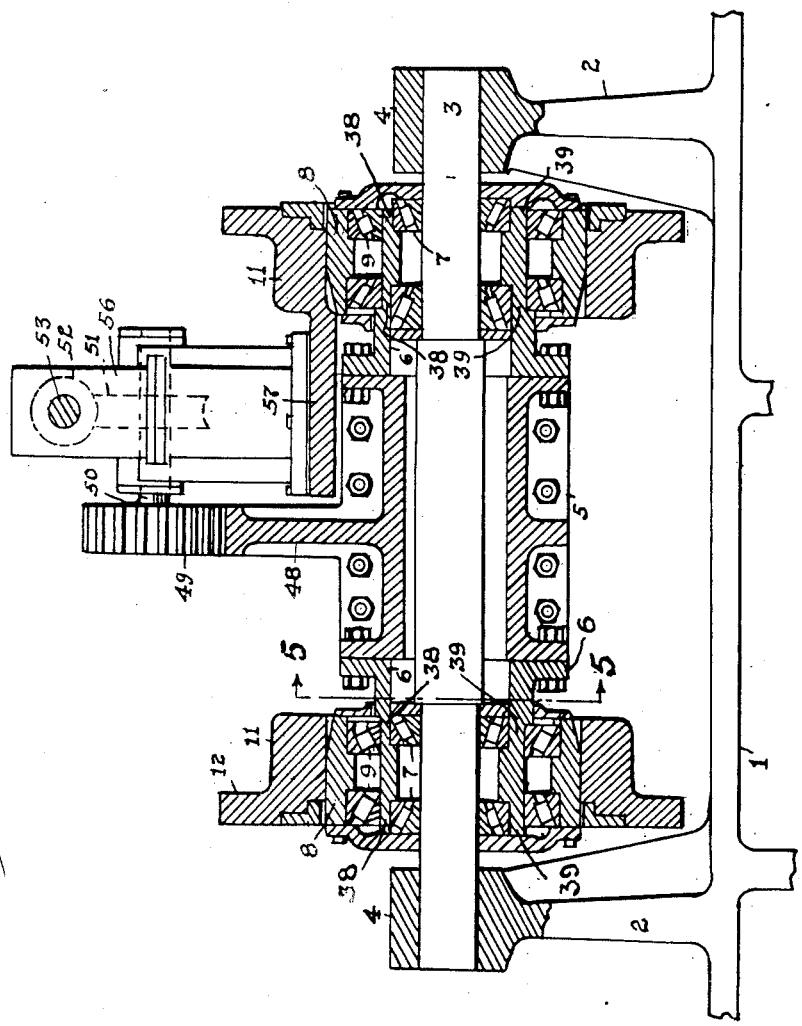

Patented Nov. 27, 1934

1,982,496

UNITED STATES PATENT OFFICE 1,982,496

ELECTRIC WELDING MACHINE

Howard J. Burnish, Sewickley, Pa., assignor to Spang, Chalfant & Company, Inc., Pittsburgh, Pa., a corporation of Pennsylvania Application October 2, 1931, Serial No. 566,469

19 Claims. (Cl. 219—6)

This invention relates to machines for electrically welding the longitudinal seams of formed tubes.

One object of this invention is to provide an improved means and method of bringing the electrodes into contact with the tubes to initiate the welding, and of applying a predetermined pressure of the welding contacts or electrodes upon the tubes during the welding operation. Another object is to employ an efficient means, such as an eccentric means, for raising and lowering the electrodes so that the latter will not injure the ends of the tubes or be themselves injured by contact with the tubes. Another object is to mount the electrodes on a substantially horizontal beam having a limited oscillating or vertical swinging movement and carrying an adjustable counter-weight to regulate the pressure of the electrodes on the tubes and thereby regulating the intimacy of the contact of the electrodes with the tubes. Another object is to provide separate power units for operating the different features specified above. A still further object is to provide an adjustable mechanism for limiting the oscillating or rocking movement of the beam in order to retain the electrodes in approximately operating position. Another object is to provide an overrunning clutch-connection between the welding contacts and its driving means, so that the peripheral speed of the contacts may be automatically accommodated to the speed through a machine of a formed tube during a welding operation. This greater speed is permitted by the overrunning clutch on the shaft 14. As the pipe engages the rotary contacts they are free to adjust their peripheral speed to the lineal speed of the pipe. Other objects appear hereinafter.

Referring to the accompanying drawings, Fig. 1 is a side view of a welding machine employing one form of my invention, portions being broken away. Fig. 2 is a plan view of Fig. 1. Fig. 3 is a section on the line 3—3 on Fig. 2, parts being in side elevation. Fig. 4 is an enlarged view of the central portion of Fig. 3. Fig. 5 is a section on the line 5—5 on Fig. 6. Fig. 6 is a section on the line 6—6 on Fig. 1. Fig. 7 is a section on the line 7—7 on Fig. 1. Fig. 8 is a plan view of the beam with a portion broken away.

On the drawings, 1 designates a pedestal, its lower portion having been broken away. The upper end of the pedestal has the upstanding arms 2 which support the fixed shaft 3 at their upper ends, the shaft being held in place by the caps 4 bolted to the upper faces of the arms 2. 5 is a sleeve surrounding the central portion of the shaft 3 and being spaced radially therefrom. The ends of the sleeve have bolted thereto the tubular bearing members 6 which surround the shaft 3 and rotate on roller bearings 7 confined between the shaft 3 and the inner faces of the bearing members 6. The outer portions of the bearing members 6 are surrounded by the rings 8 which are concentric with the shaft 3, there being a pair of roller bearings 9 between each ring 8 and that portion of the bearing member 6 which it encircles.

10 is a substantially horizontal beam having between its ends the hubs 11 mounted on the peripheries of the rings 8, the hubs being carried by the sides of the spaced side members 12 constituting the rear end of the oscillatory beam 10. The beam carries at its forward or left hand end the shaft 14 on which is mounted the horizontal axially alined transformer 15 and the rotary contacts or electrodes 16. The details of the transformer and of the electrodes form no part of the present invention, but may be of the general type shown in Patent No. 1,478,262 granted December 18, 1923 to H. E. Snodgrass and T. M. Hunter. However, I prefer that the rotary contacts be built in accordance with those shown on my application Ser. No. 562,079, filed September 10, 1931.

The beam 10 carries the motor 17 which drives the pinion 18 meshing with the spur gear 19 on the shaft 20, the latter carrying the worm 21 which meshes with the worm wheel 22 which surrounds the shaft 14 at the end thereof opposite that which supports the rotary countacts 16. An annular series of clutch balls or rollers 23 surround the shaft 14 within the worm wheel 22, each ball having a tapering seat between the bearing ring 24 on the shaft and the ball guides 25, all of which are inclined so as to prevent the escape of the balls in the anti-clockwise direction. The balls are carried by a ring 26 surrounding the bearing ring 24 and having slots in which the balls are loosely seated. It is seen that if the worm wheel 22 is rotated in the clockwise direction the clutch balls 23 will cause the shaft 14 to rotate in the same direction, but if the shaft 14 is rotated in clockwise direction the balls 23 will become loose in their guides and allow the shaft 14 to turn independently of the worm wheel.

The upper edges of the members 12 of the beam 10 form a track for the rollers 27 carried by shafts 28 having bearings 29 in the vertical sides of the adjustable weight 30. The weight 30 is hollow and surrounds the side members 12 as shown in Fig. 7. The side members 12 are connected by the two cross bars 31 which support the ends of the fixed screw 32. The weight has the slot 33 therein to receive the spur gear 34 whose central portion is threaded and works on the screw 32. The gear 34 is operated by the pinion 35 on the shaft 36 of the motor 37 which is supported on the upper face of the weight 30.

Referring particularly to Fig. 6, the two tubular bearing members 6 have radial portions 38 which are radially less thick than the diametrically opposite radial portions 39. These portions are between the roller bearings 7 and 9 so that the combined structure including the sleeve 5 and the bearing members 6 form a cam structure or a pair of cams which will raise and lower the beam 10 bodily through their action on the hubs 11.

The pedestal 1 carries the vertical screw 40 positioned below the beam 10 and driven by the motor 41. The block 42 acting as a nut is operated vertically by the screw 40. A tension rod or brace 43 has its lower end pivotally supported in the block 42 as shown at 44. The upper end of the rod 43 is provided with a transverse pin 45 which has slight travel in the slot 46 in the bracket 47 attached to the lower face of the beam at the side of the arms 2 opposite the transformer and rotary contacts.

The sleeve 5 is provided with the segment or quadrant 48 having its peripherial portion geared to the pinion 49 mounted on the shaft 50 which is driven by the worm wheel 51. The latter is driven by the worm 52 on the shaft 53 of the motor 54 seated on the cross support 55 carried by the upper portion of the beam on that side of the shaft 3 on which the shaft 14 is supported. The housing 56 for the worm wheel 51, the worm 52 and the shaft 53 is supported on the bracket or base 57 carried by one of the side members 12 near the adjacent hub 11.

58 is a horizontal roller to support the tube 59 as it passes through the welding machine, there being two vertical rollers 60 to support the opposite lateral portions of the tube.

Before a tube to be welded has been fed to the machine, the motor 54 has been operated to cause the tubular bearing members 6 to be rotated in such a direction as to elevate the beam 10 so that the rotary contacts 16 will be above but close to the path which the upper side of the tube 59 will take as it passes through the machine. Just as the advancing end of the tube comes to the vertical plane which includes the axial center of the shaft 14, the motor 54 is operated to cause the beam 10 to be lowered so that the welding contacts come down directly upon the upper side of the tube with its two contacts upon opposite sides of the longitudinal edges thereof to be welded together, the motor 54 being started either manually or automatically by the feeding movement of the tube. It is to be understood that the motor 17 has been set in operation so as to rotate the welding contacts 16 in the clockwise direction before the rotary contact 16 engages the tube 59. The tube is fed to the left by any suitable means at a slightly greater speed than that given the rotary contacts by the motor 17. By the arrangement and operation described there is practically no shock upon the periphery of the rotary contacts such as there would be if the rapidly moving tube should engage the rotary contacts while they were stationary. As the tube 59 travels during the welding operation the rotary contacts together with the transformer 15 and the shaft 14 are rotated in the clockwise direction causing the clutch balls 23 to be moved slightly clockwise, thus permitting the rotary contacts, the transformer and the shaft 14 to rotate independently of the motor 17 and all of the driven parts therefrom including the worm wheel 22. As the tube travels during the welding operation, a predetermined pressure of the rotary contacts 16 is maintained upon the tube so that the desired value of current shall travel from one rotary contact 16 and through the edges of the tube to be welded to the other rotary contact 16. The intimacy of the contact between the rotary contacts and the tube can be regulated by causing the weight 30 to be moved in one direction or the other by the motor 37.

A mandrel 61 carrying the rollers 62, one above the other and directly between the points where the tube 59 is engaged by the rotary contacts 16 and the pipe-supporting roller 58, is maintained within the tube in any suitable well known way.

The ends of the slot 46 should be positioned relative to the pin 45 so that the latter cannot interfere with the vertical movements of the beam 10. When the contacts 16 are above the line of travel of the tube 59, the pin 45 should be at the lower end of the slot 46 in order that the beam 10 cannot be accidently tilted to position the contacts 16 in the path of the advancing end of the tube 59. When the beam has been lowered bodily by the cams to welding position the pin 45 should be about central in the slot 46 in order to allow the beam to oscillate in accommodation to small irregularities encountered by the contacts 16 and the mandrel rollers 62.

I claim:—

1. In a tube-welding machine, a beam member, means oscillably supporting the beam member between its ends, a pair of welding contacts carried by the beam member at one side of the supporting means and adapted to conduct welding current to adjacent edges of a formed tube as the latter passes through the machine, and a counterweight adjustable longitudinally of the beam member at the other side of the supporting means to regulate the pressure of the contacts on the tube during the welding thereof.

2. In a tube-welding machine, a beam member, means oscillably supporting the beam member between its ends, a pair of welding contacts carried by the beam member at one side of the supporting means and adapted to conduct welding current to adjacent edges of a formed tube as the latter passes through the machine, a counterweight adjustable longitudinally of the beam member at the other side of the supporting means to regulate the pressure of the contacts on the tube during the welding thereof, and means for raising and lowering the beam member to cause the welding contacts to engage the surface of the tube to initiate the welding thereof and disengage them therefrom at the conclusion of the welding thereof.

3. In a tube-welding machine, a beam member, means oscillably supporting the beam member between its ends, means limiting the oscillatory movements of the beam member, a pair of welding contacts carried by the beam member at one side of the supporting means and adapted to conduct welding current to adjacent edges of a formed tube as the latter passes through the machine, and a counterweight adjustable longitudinally of the beam member at the other side of the supporting means to regulate the pressure of the contacts on the tube during the welding thereof.

4. In a tube-welding machine, a beam member, means oscillably supporting the beam member between its ends, a pair of welding contacts carried by the beam member at one side of the supporting means and adapted to conduct welding current to adjacent edges of a formed tube as the latter passes through the machine, a counterweight adjustable longitudinally of the beam member at the other side of the supporting means to regulate the pressure of the contacts on the tube during the welding thereof, and eccentric means for raising and lowering the beam member to cause the welding contacts to engage the surface of the tube to initiate the welding thereof and disengage them therefrom at the conclusion of the welding thereof.

5. In a tube-welding machine, a beam member, means oscillably supporting the beam member between its ends, a pair of welding contacts carried by the beam member at one side of the supporting means and adapted to conduct welding current to adjacent edges of a formed tube as the latter passes through the machine, a counterweight adjustable longitudinally of the beam member at the other side of the supporting means to regulate the pressure of the contacts on the tube during the welding thereof, eccentric means for raising and lowering the beam member to cause the welding contacts to engage the surface of the tube to initiate the welding thereof and disengage them therefrom at the conclusion of the welding thereof, and a power unit for actuating the eccentric means.

6. In a tube-welding machine, a substantially horizontal beam member, means oscillably supporting the beam member between its ends, a transformer and welding contacts supported by the beam member at one side of the supporting means, and a counterweight associated with the beam member and adapted to counterbalance the weight of the transformer and the contacts.

7. In a tube welding machine, a beam member, means oscillably supporting the beam member between its ends, and a pair of welding contacts carried by the beam member at one side of the supporting means and adapted to conduct welding current to the adjacent edges of a formed tube as the latter passes through the machine, the supporting means comprising an eccentric bearing element free to oscillate independently of said beam and adapted to impart an elevating or lowering movement to the beam.

8. In a tube welding machine, a beam member pivoted between its ends, rotary welding contacts supported by the beam member at one side of its pivotal support, an adjustable counterweight movable on the beam member at the other side of its pivotal support, and adjustable means having a lost motion connection with the beam for limiting the oscillation of the beam member.

9. In a tube welding machine, a beam member pivoted between its ends, rotary welding contacts supported by the beam member at one side of its pivotal support, an adjustable counterweight movable on the beam member at the other side of its pivotal support, adjustable means having a lost motion connection with the beam for limiting the oscillation of the beam member, and a motor for adjusting the last-named means.

10. In a tube welding machine, a beam member pivoted between its ends, rotary welding contacts supported by the beam member at one side of its pivotal support, an adjustable counterweight movable on the beam member at the other side of its pivotal support, a lost motion arm connected to the beam member to limit its oscillation, a block to which the arm is attached, a screw for giving travel to the block, and power means for rotating the screw.

11. In an electric welding machine, the combination of a beam member supported intermediate of its ends to oscillate on a substantially horizontal axis, welding contacts carried by the beam member at one side of its axis, and a counterweight carried by the beam member at the other side of its axis.

12. In an electric welding machine, the combination of a beam member supported intermediate of its ends to oscillate on a substantially horizontal axis, welding contacts carried by the beam member at one side of its axis, a counterweight carried by the beam member at the other side of its axis, and means for adjustably positioning the counterweight along the beam member.

13. In an electric welding machine, the combination of a beam member supported intermediate of its ends to oscillate on a substantially horizontal axis, welding contacts carried by the beam member at one side of its axis, a counterweight carried by the beam member at the other side of its axis, and means independent of the counterweight to regulate the pressure of the welding contacts on the work.

14. In an electric welding machine, the combination of a beam member supported intermediate of its ends to oscillate on a substantially horizontal axis, welding contacts carried by the beam member at one side of its axis, a counterweight carried by the beam member at the other side of its axis, means for adjustably positioning the counterweight along the beam member, and means independent of the counterweight to regulate the pressure of the welding contacts on the work.

15. In an electric welding machine, the combination of a base, a beam member supported intermediate of its ends from the base and arranged for oscillation on a substantially horizontal axis, welding contacts carried by the beam member at one side of its axis, a counterweight carried by the beam member at the other side of its axis, and means connected between the beam member and the base for regulating the pressure of the welding contacts on the work.

16. In an electric welding machine, the combination of a base, a beam member supported intermediate of its ends from the base and arranged for oscillation on a substantially horizontal axis, welding contacts carried by the beam member at one side of its axis, a counterweight carried by the beam member at the other side of its axis and adjustable along the beam member, and means connected between the beam member and the base for regulating the pressure of the welding contacts on the work.

17. In an electric welding machine, the combination of a base, a beam member supported from the base and arranged for oscillation on a substantially horizontal axis, welding contacts carried by the beam member at one side of its axis, a counterweight carried by the beam member at the other side of its axis, and means for varying the elevation of the axis of oscillation of the beam member relative to the base.

18. In an electric welding machine, the combination of a base, a beam member supported from the base and arranged for oscillation on a substantially horizontal axis, welding contacts carried by the beam member at one side of its axis, a counterweight carried by the beam member at the other side of its axis and adjustable along the beam member, and means for varying the elevation of the axis of oscillation of the beam member relative to the base.

19. In an electric welding machine, the combination of a support, welding contacts mounted on said support and arranged for movement relative thereto, and means comprising eccentric members interposed between the support and the electric contacts for raising and lowering the latter.

HOWARD J. BURNISH.